United States Patent
Simons et al.

(10) Patent No.: US 8,731,329 B2
(45) Date of Patent: May 20, 2014

(54) SYSTEMS AND METHODS FOR ROLLING SHUTTER ARTIFACT REPAIR

(75) Inventors: David P. Simons, Seattle, WA (US); Daniel Wilk, Seattle, WA (US); Xue Bai, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 8 days.

(21) Appl. No.: 13/550,031

(22) Filed: Jul. 16, 2012

(65) Prior Publication Data

US 2014/0016877 A1    Jan. 16, 2014

(51) Int. Cl.
*G06K 9/36* (2006.01)
*G06T 3/40* (2006.01)
*H04N 1/387* (2006.01)

(52) U.S. Cl.
CPC .......... *G06T 3/4038* (2013.01); *H04N 1/3876* (2013.01)
USPC ........................... 382/284; 382/236; 382/294

(58) Field of Classification Search
CPC ................. G06T 2207/10016; G06T 7/2033; G06T 7/20; G06K 9/3233; G06K 9/00777
USPC ......... 382/103, 154, 236, 255, 276, 284, 294; 345/473, 619; 375/240.16, E7.04, 375/E7.081
See application file for complete search history.

(56) References Cited

U.S. PATENT DOCUMENTS 6,037,988 A * 3/2000 Gu et al. .................. 375/240.16
7,460,730 B2 * 12/2008 Pal et al. ....................... 382/284

* cited by examiner

*Primary Examiner* — Anh Do
(74) *Attorney, Agent, or Firm* — Kilpatrick Townsend & Stockton LLP

(57) ABSTRACT

Systems and methods for rolling shutter artifact repair are disclosed. For example, one disclosed method includes the steps of receiving two frames ($F_0$, $F_2$) of a video, identifying a first plurality of features in frame $F_0$ and a second plurality of features in frame $F_2$, determining movements of corresponding features in the first and second pluralities of features, generating a mesh based on the first and second pluralities of features and the movements, and generating a warped frame ($F_0'$) based on the mesh

23 Claims, 13 Drawing Sheets

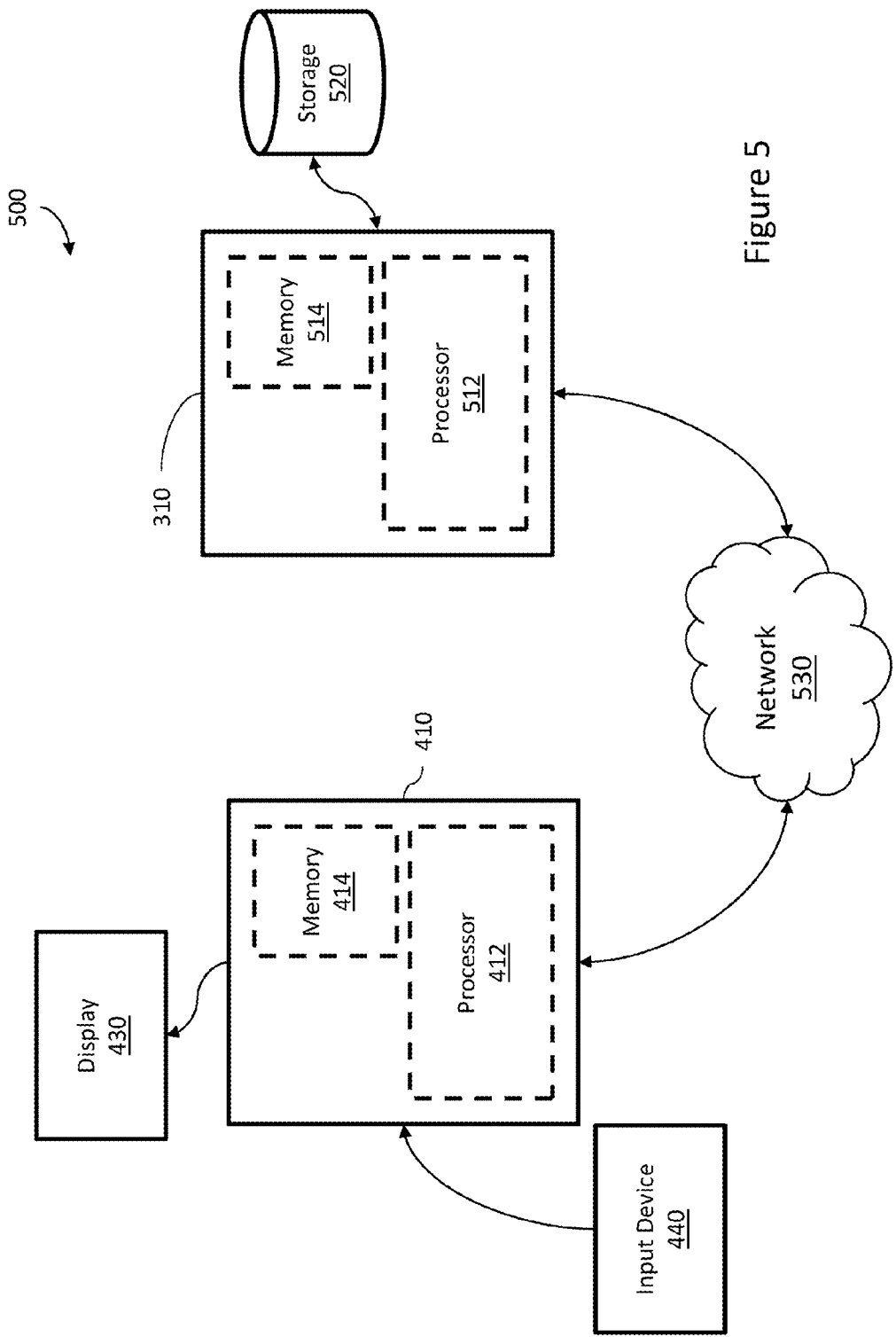

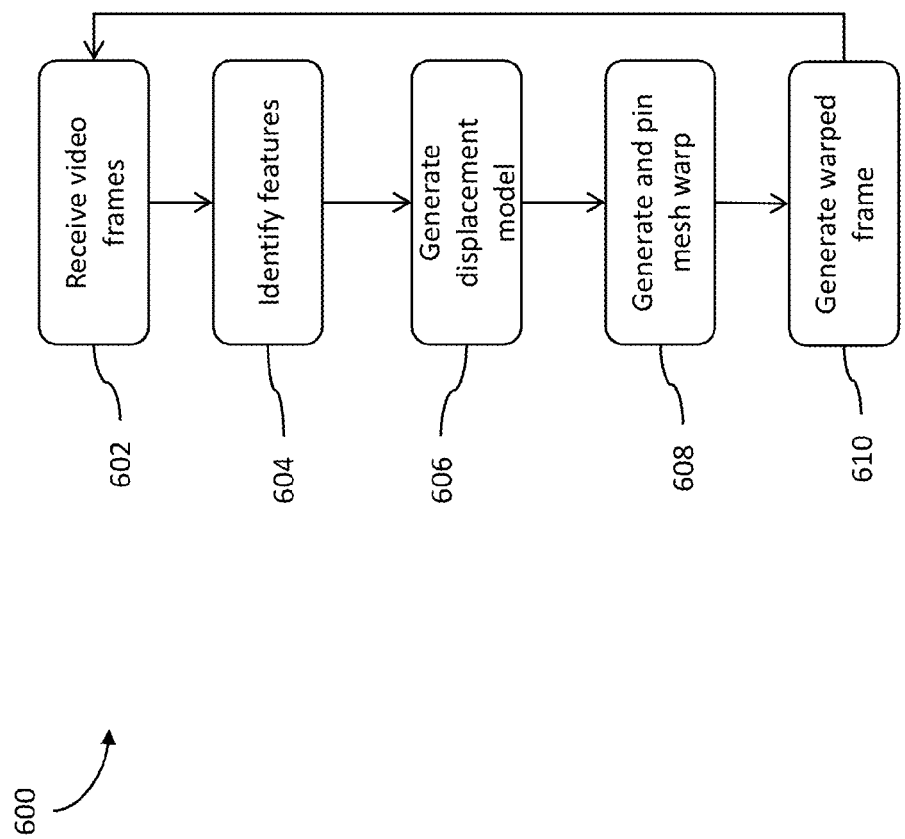

__US 8,731,329 B2__

SYSTEMS AND METHODS FOR ROLLING SHUTTER ARTIFACT REPAIR

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD

The present disclosure generally relates to image processing and more specifically relates to rolling shutter artifact repair.

BACKGROUND

Digital cameras have become more prevalent and are commonly used both to capture single frames and for capturing full motion video. Such cameras employ different types of sensors to capture images and to store the images to memory. Some types of sensors transmit data as a series of scan lines to be written to memory. For example, CMOS sensors comprise a two-dimensional array of sensor elements where each row of the array is a scan line. Images are captured by reading each scan line in succession. However, because the scan lines are not all read simultaneously, the data read from the first scan line is data from a different moment in time than data read from the next scan line read, and so forth. For images of scenes with little or no movement, such a time delay in reading each of the scan lines has little or no impact on the resulting image. However, if an image of a scene includes an object that is moving through the scene quickly, during the time delay ($\Delta t$) between capturing the data from the first scan line and the last scan line, the object may have moved a noticeable distance. Thus, the resulting image will include image data captured when the object is at its initial position at time, $t_1=0$, and each successive scan line will capture the object after it has moved a small amount until the last scan line is captured at time, $t_n=\Delta t$. For objects moving sufficiently quickly, the change in position from $t_1$ to $t_n$ may be substantial and, thus, the object may appear distorted.

SUMMARY

The present disclosure describes embodiments of systems and methods for rolling shutter artifact repair. For example one disclosed method comprises receiving two frames ($F_0$, $F_2$) of a video; identifying a first plurality of features in frame $F_0$ and a second plurality of features in frame $F_2$; determining movements of corresponding features in the first and second pluralities of features; generating a mesh based on the first and second pluralities of features and the movements; and generating a warped frame ($F_0'$) based on the mesh. In another embodiment, a computer-readable medium comprises program code for causing one or more processors to execute such a method.

These illustrative embodiments are mentioned not to limit or define the disclosure, but rather to provide examples to aid understanding thereof. Illustrative embodiments are discussed in the Detailed Description, which provides further description of the disclosure. Advantages offered by various embodiments of this disclosure may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIGS. 4-5 show illustrative systems for rolling shutter artifact repair according to various embodiments;

FIG. 6 shows an illustrative method for rolling shutter artifact repair according to one embodiment; and

DETAILED DESCRIPTION

Example embodiments are described herein in the context of systems and methods for rolling shutter artifact repair. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

Illustrative Method for Rolling Shutter Artifact Repair

In one illustrative method of rolling shutter artifact repair, a user films a scene while driving through the scene in a car. The user's video camera captures each frame of video by successively reading scan lines from the camera's sensor until each scan line has been read, at which time, the frame is stored. When the next frame is to be captured, the camera against captures each scan line in succession. Because there is a time delay between capturing the first scan line and the last scan line, the scene being captured may change during the time delay, such as if an object is moving through the scene or if the camera itself is moving while capturing the frame.

Figure 3A:
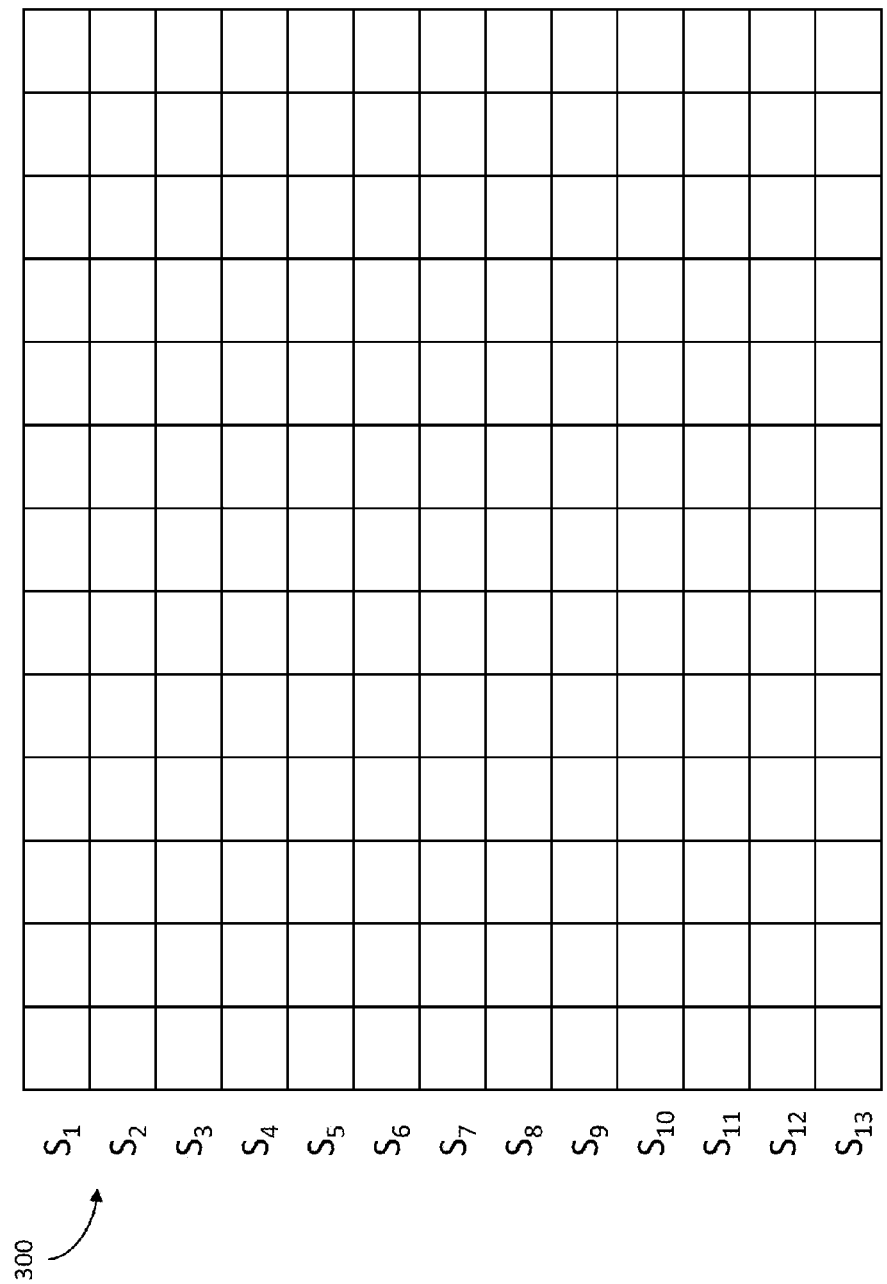
FIGS. 3A-B show representations of an image sensor.

For example, a representation of an image sensor 300 is shown in FIG. 3A. The sensor 300 has 13 scan lines $S_1$-$S_{13}$, and each scan line has a number of sensor elements, each of which captures a pixel of image data. When the sensor is read, the camera reads each value from each sensor element in each scan line, $S_1$-$S_{13}$, in succession, beginning with scan line $S_1$. It takes a small amount of time to read each scan line. In this embodiment, assuming that each scan line requires 1 millisecond (ms) to read, 12 ms will elapse between the first scan, $S_1$, line being read and the last scan line, $S_{13}$, being read. During this 12 ms delay, objects in the image may move and thus, during the 12 ms of delay, an object's position may change. Note that while the sensor array shown in FIG. 3A includes horizontal scan lines, some sensors may employ vertical scan lines, though such an arrangement does not affect the embodiments disclosed herein.

Figure 1A:
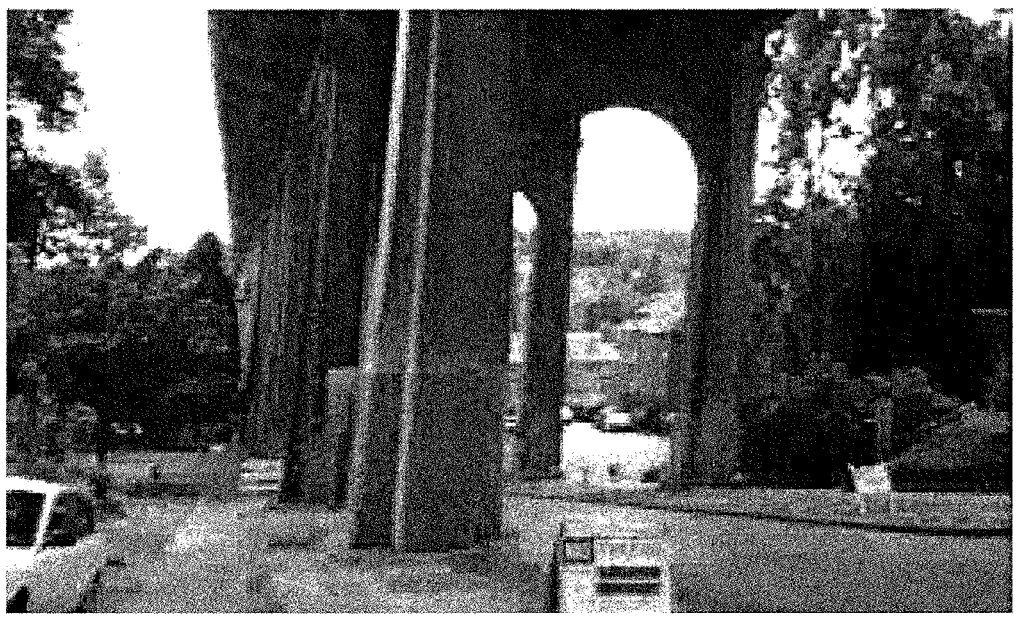
FIGS. 1A-F show video frames and black and white representations of the video frames showing distortion.
Figure 1B:
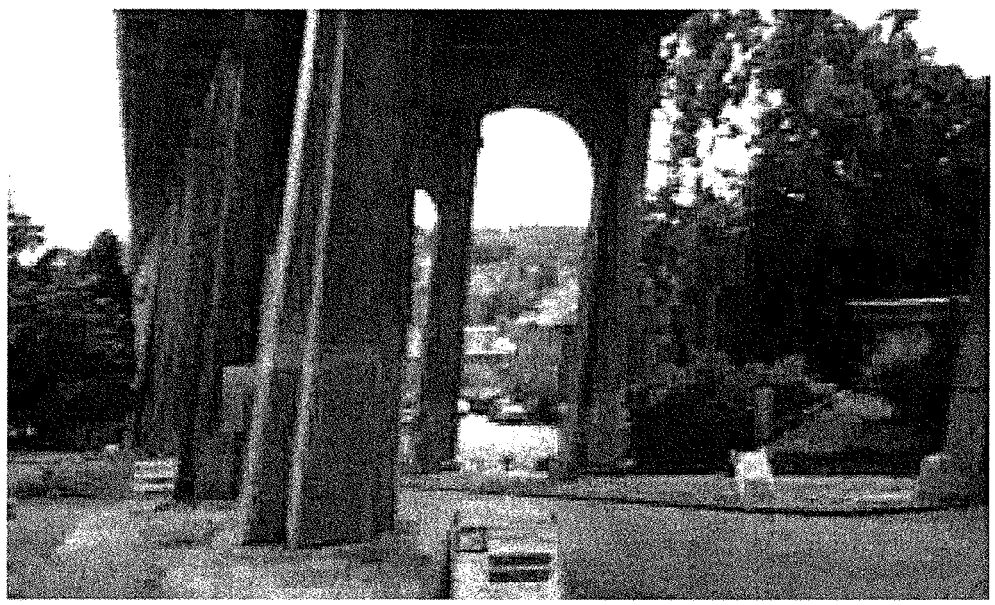
Figure 1C:
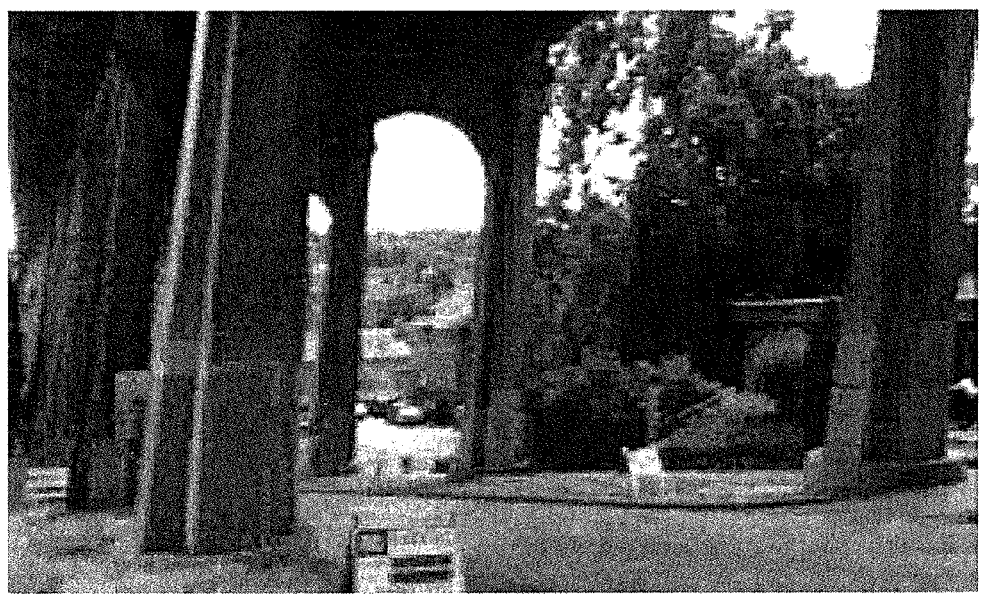
Figure 1D:
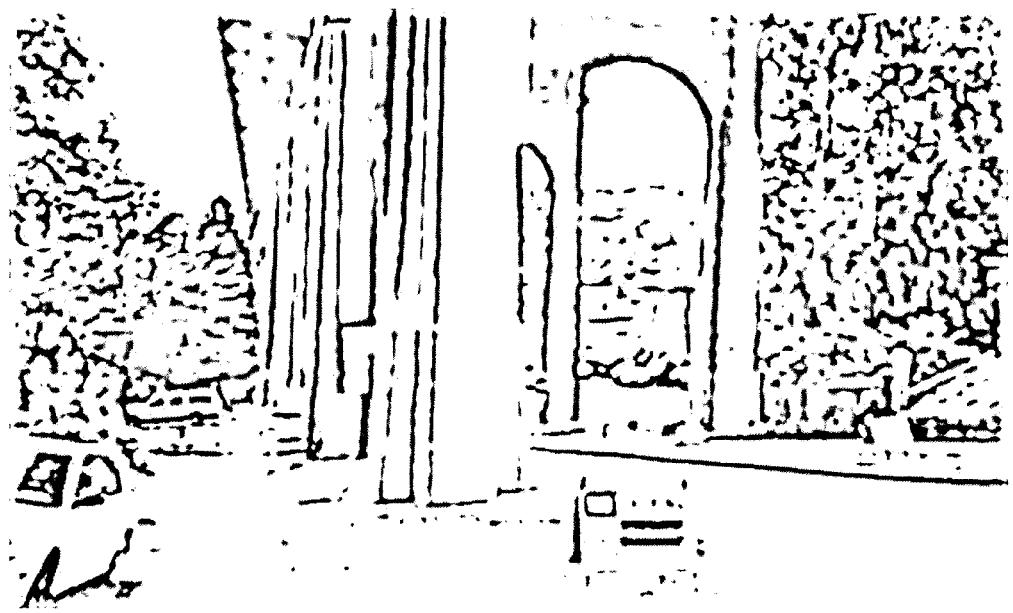
Figure 1E:
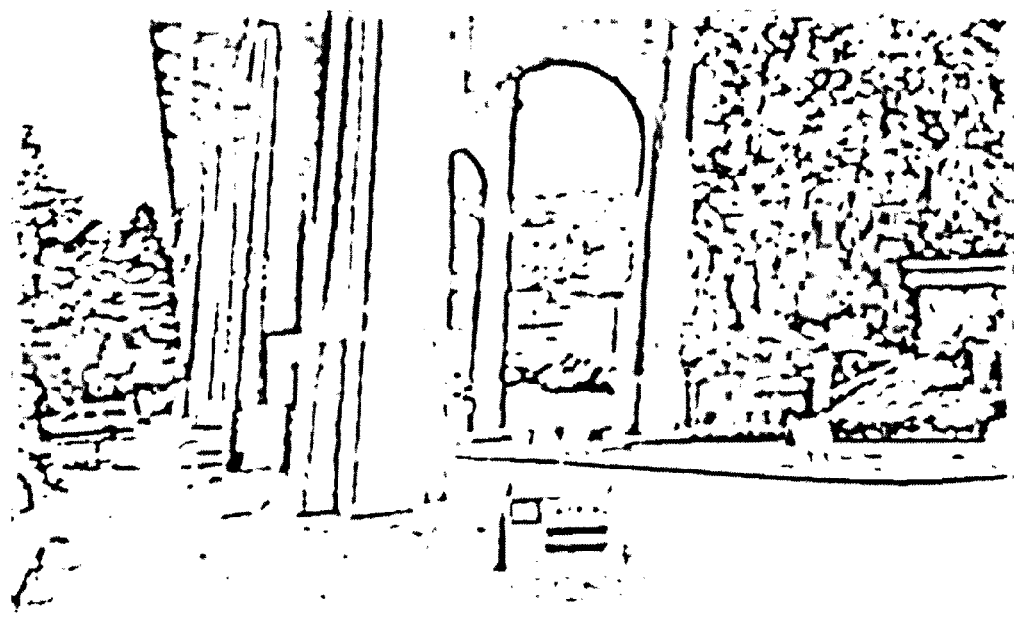
Figure 1F:
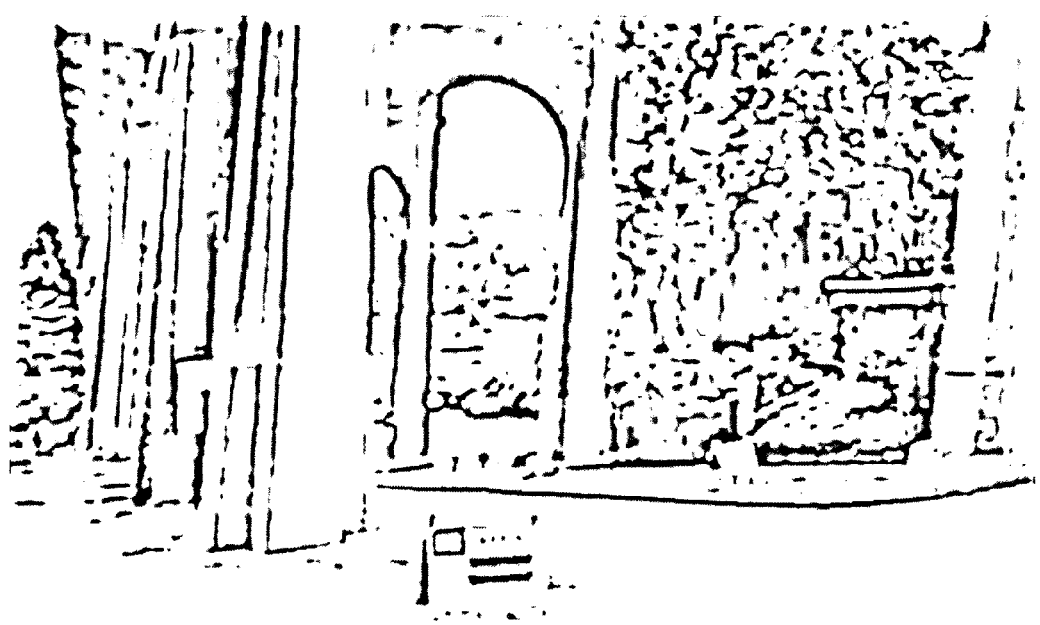

Returning to the illustrative method, as the user's camera captures each frame while moving through the scene, the frames captured by the camera appear skewed, which may be seen in the original video frames in FIGS. 1A-C, and black and white line representations shown in FIGS. 1D-F. As may be seen, the support columns of the overpass appear to be slanted or leaning to the right. In fact, the support columns are approximately vertical and have been skewed due to motion of the camera from left to right. To reduce or remove this distortion, the user executes an artifact repair software application.

In this illustrative embodiment, an artifact repair application is provided with three successive frames of video, such as frames 1A-1C, in which the middle frame, i.e. frame 1B in this example, will be corrected. The application identifies features within each of the frames and then determines how much they have moved between frames. The movement of the features is then used to determine movements of each of the pixels in the middle frame. These movements are then used to construct a mesh corresponding to the frame. The edges of the mesh that fall inside the frame are then "pinned" to the edge of the destination frame such that when the frame is subsequently warped, all parts of the output frame have valid pixels. Finally, the frame is warped using the mesh to remove the distortions, such as the skewing, in the middle frame. The resulting frame can be seen in FIG. 2A and the black and white representation in FIG. 2B. This middle frame is then replaced by the warped middle frame in the video, and the process is repeated for successive frames in the video. Note that while the middle frame is now corrected, corrections to the next frame will be based on the unwarped middle frame so that features and movements can be correctly determined.

This illustrative example is given to introduce the reader to the general subject matter discussed herein and this disclosure is not limited to this example. The following sections describe various additional non-limiting embodiments and examples of devices, systems, and methods for rolling shutter artifact repair.

Figure 4:
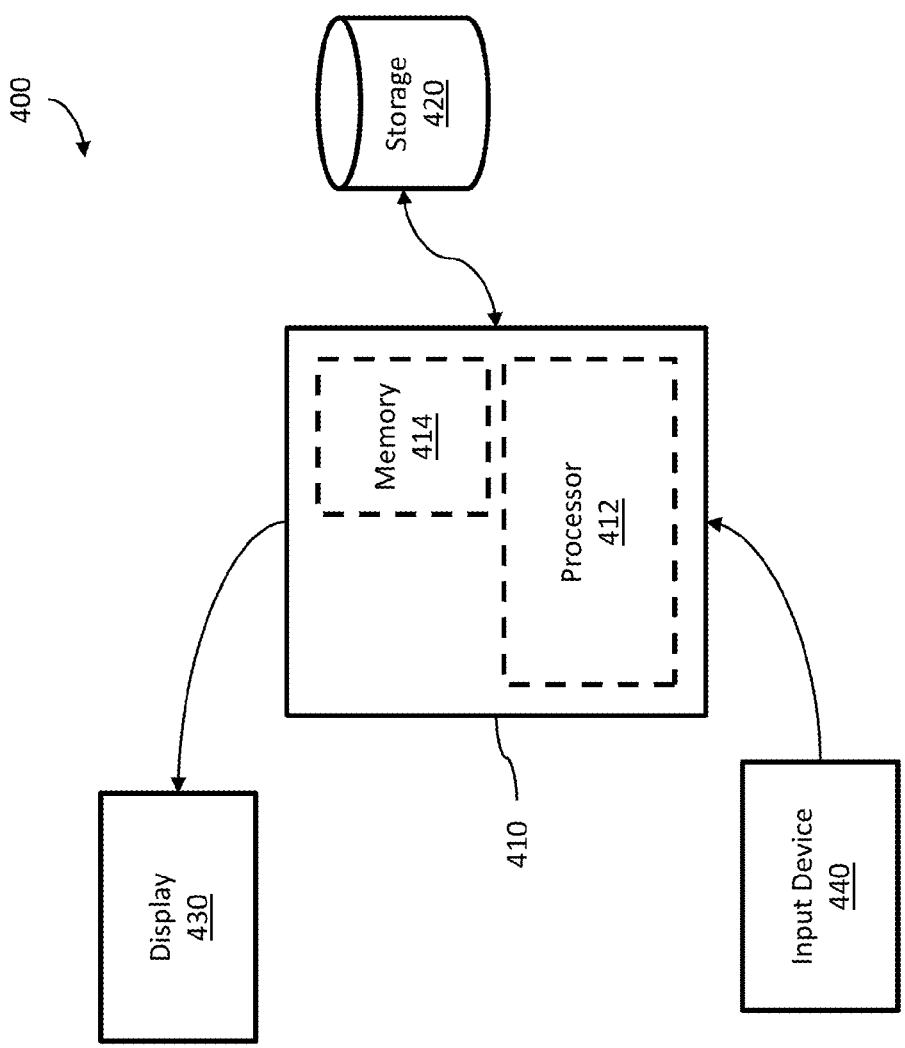

Referring now to FIG. 4, FIG. 4 shows a system 400 for rolling shutter artifact repair according to one embodiment of the present disclosure. The system 400 shown in FIG. 4 comprises a computer 410, which comprises a processor 412 and a memory 414, where the processor 412 is in communication with the memory 414. The computer 410 is in communication with a display 430 and an input device 440, as well as storage device 420.

In the embodiment shown in FIG. 4, the processor 412 is in communication with memory 414 and is configured to execute a software application that provides rolling shutter artifact repair according to various embodiments. The software application may be stored within the memory 414 or in another memory, either local to or remote from the computer 410. The software application, as will be described in greater detail below, is configured to receive video frames from a computer-readable medium, such as memory 414 or storage device 420.

In some embodiments, the input device 440 may comprise a computer mouse, a joystick, a stylus, a camera (e.g. a video camera), or a flash memory reader that is coupled to or in communication with the computer 410. For example, in one embodiment, the rolling shutter artifact repair application may be configured to receive video frames from a video camera 440 connected to the computer 410. In some embodiments, the input device 440 may be configured to provide commands to the rolling shutter artifact repair application. For example, in one embodiment, the input device 440 comprises keyboard and a mouse.

Signals from the input device 440 may be transmitted to the computer via a communications bus, such as USB, FireWire, or other suitable communications interface. The processor 412 receives such signals and processes them to determine actions responsive to said signals. For example, if signals received from the input device 440 comprise video frames, the processor 412 may receive the signals and provide information from the signals to the rolling shutter artifact repair application to process the frames.

The processor 412 is also in communication with storage device 420, which is configured store data. In some embodiments, the storage device 420 comprises a non-volatile computer readable medium, such as a hard disk, coupled to or disposed within the computer. In some embodiments, the storage device 420 is remote from the computer 410, such as a network-connected hard disk or a remote database system. In some embodiments, the processor 412 is configured to generate a file to store data, such as data received from the input device 440, in the storage device 420, or to store output data, such as video frames that have been modified by a rolling shutter artifact repair application.

Referring now to FIG. 5, FIG. 5 shows a system 500 for rolling shutter artifact repair according to one embodiment of the present disclosure. The system 500 shown in FIG. 5 comprises a computer 410, which comprises a processor 412 and a memory 414, where the processor 412 is in communication with the memory 414. The computer 410 is in communication with a display 430 and an input device 440. In addition, the computer 410 is in communication with second computer 510 via network 530. In the embodiment shown in FIG. 5, the second computer 510 comprises a processor 512 and a computer-readable medium 514, and is in communication with storage device 520.

In the embodiment shown in FIG. 5, client computer 410 is configured to execute a front end for a software application for rolling shutter artifact repair and the remote computer 510 is configured to execute processing for the software application for rolling shutter artifact repair. For example, the client computer 410 receives video frames from an input device, such as a video camera or a flash memory card and reader, and transmits the video frames to the second computer 510 across the network 530. The processor 512 in the second computer is configured to receive the video frames and execute a rolling shutter artifact repair process. The second processor 512 then generates one or more signals to transmit to the first computer 410 based on output of the rolling shutter artifact repair process. The processor 412 at the first computer 410 receives the signals from the second computer 510 and generates one or more display signals based on the signals from the second computer 510. The processor 412 then transmits the display signals to the display 430, which displays one or more images based on the display signals.

Referring now to FIG. 6, FIG. 6 shows a method 600 for rolling shutter artifact repair according to one embodiment. The embodiment shown in FIG. 6 will be described with respect to the system 400 shown in FIG. 4, but is not restricted to use only on the system 400 of FIG. 4. Other embodiments according to this disclosure are suitable for performing the method 600 of FIG. 6, such as the system 500 shown in FIG. 5 as well as other systems within the scope of this disclosure.

The method 600 begins in block 602 when a plurality of frames of video are received by an application configured to perform artifact repair (the "artifact repair application") executed by the processor 412. For example, in one embodiment, the artifact repair application loads a video file having a plurality of frames from a hard disk or other computer-readable medium, such as a flash memory card. In another embodiment, the artifact repair application receives streaming video from a remote computer or video frames from a video camera in real time.

After receiving the plurality of video frames, the artifact repair application selects a plurality of frames on which to operate. In the embodiment shown in FIG. 6, the artifact repair application is configured to select three consecutive frames of video ($F_1$, $F_2$, and $F_3$). The artifact repair application is then configured to generate a modified version of the middle frame of the three, $F_2$, according to the steps of method 600 described herein. Throughout the description of this method 600, "middle frame" or "$F_2$" will each refer to the frame to be modified or repaired.

Note, however, in some instances, three consecutive frames of video may not be not available. For example, if the artifact repair application is configured to modify the first frame of video, there is no preceding video frame and thus, only two frames of video are selected: the first frame of video and the second frame of video. A similar issue exists for the last frame of video as no subsequent frame of video exists. Such conditions are discussed in greater detail below.

In some embodiments, the artifact repair application receives a selection of a plurality of video frames from a user. For example, in one embodiment, the user may select a subset of frames in a video on which to execute the artifact repair application. In one embodiment, a user may select non-consecutive frames of video, for example if the user intends to delete one or more frames of video from the video file. In a further embodiment, non-consecutive frames of video may be selected based on a desired frame rate for an output video file that is different from the frame rate of the input video file, or for other reasons. After receiving the plurality of frames of video, the process moves to block 604.

In block 604, the artifact repair application then analyzes the plurality of frames to identify features within each of the frames, such as portions of edges of objects, or other identifiable visual features within the frame. In this embodiment, to identify features in the frames, the artifact repair application executes a Kanade-Lucas-Tomasi (KLT) feature extraction algorithm on the frames. However, other suitable feature-tracking or feature-extraction algorithms may be used in various embodiments according to this disclosure.

After identifying features in each of the frames, the artifact repair process identifies common features in the plurality frames, e.g. features that appear in the middle frame and at least one of the other frames. For example, in the embodiment shown in FIG. 6, in which frames $F_1$, $F_2$, and $F_3$ were selected, any feature that appears in $F_2$ (the frame to be modified) and either (or both) of $F_1$ or $F_3$ may be used. In embodiments where only two frames are analyzed, any feature that appears in both frames may be used. After identifying the common features, the method 600 proceeds to block 606.

In block 606, the artifact repair application generates a displacement model for each pixel in the frame to be modified, $F_2$. In this embodiment, the artifact repair application determines spatial offsets for each of the identified common features in frame $F_2$. As a part of the process of determining the spatial offsets, the artifact repair application uses some additional information.

In this embodiment, the artifact repair application is configured according to some initial parameters. First, the artifact repair application is configured to assume that the time delay between the time of capture of each scan line is linear across the entire image. In other words, the artifact repair application assumes that if scan line $S_1$ was captured at time $t=0$ and scan line $S_2$ was captured at $t=0+\Delta t$, then scan line $S_3$ was captured at time $t=0+2(\Delta t)$, scan line $S_4$ was captured at $t=0+3(\Delta t)$, and so forth. Such a linear profile is not required. For example, in some embodiments, actual performance characteristics of the sensor that captured the video may be used to determine time delays between successive scan lines.

Secondly, the artifact repair process is configured, in this embodiment, to analyze the image such that the scan line that is equidistant between the first scan line and the last scan line (referred to as the "middle scan line") is defined to have occurred at time, $t=0$, such as may be seen in FIG. 3B, which is discussed in more detail below. Thus, in this embodiment, the middle scan line represents the time from which distortion of the other scan lines will be calculated. In other embodiments, a different scan line may be used.

As a part of determining the spatial offsets in this embodiment, the artifact repair process determines a time delay factor for each feature based on its relative distance from the middle scan line (as described above). Thus, in this embodiment, as can be seen in FIG. 3B, a feature on the first scan line will have a time delay factor of −0.5 frames, a feature one the middle scan line will have a time delay factor of 0, and a feature of the last scan line will have a time delay factor of 0.5 frames. In some embodiments, different time delay factors may be used. For example, in one embodiment, the time delays may be based on the actual scan time required to capture an entire frame. If a frame is captured in 5 ms, then the middle scan line will still have a time delay factor 0, but the first scan line will have a time delay factor of −0.0025 and the last scan line will have a time delay factor of 0.0025. In another embodiment, the time delay factor may be based on the actual scan time as a proportion of the frame rate of the video. Thus, if the scan time is 5 ms to capture a frame and the frame rate of the video is 25 frames per second (40 ms per frame), then the ratio of scan time to frame rate is 0.125. Thus, the first scan line would have a time delay factor of −0.0625 and the last scan line would have a time delay factor of 0.0625. In other embodiments, other suitable factors may be used.

Figure 3B:
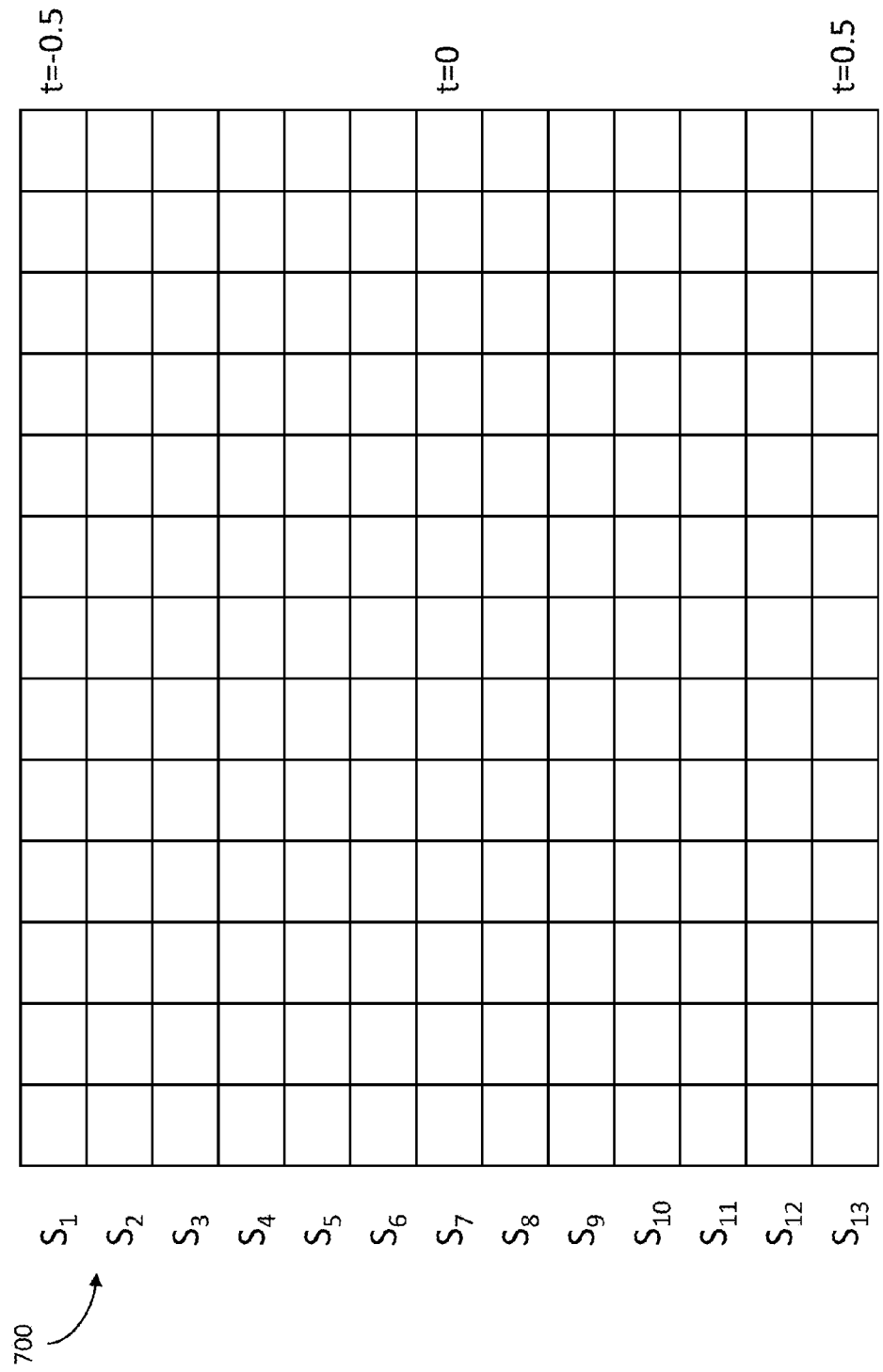

Further, while the embodiment shown in FIGS. 3B and 6 set the middle scan line as having a time delay of 0, in other embodiments, other scan lines may be selected. For example, the scan line located ⅓ of the distance from the first scan line to the last scan line may be defined as having a time delay of 0. In such an embodiment, the time delays for the first and last scan lines would be adjusted accordingly. For example, in one embodiment, if the scan line located ⅓ of the distance from the first scan line to the last scan line has a time delay of 0, then the first scan line may be defined as having a time delay of −0.333 and the last scan line may be defined as having a time delay of 0.667.

As was briefly mentioned above, in some cases, fewer than three frames may be selected for use by the artifact repair application. If the first frame of video is to be modified, there is no preceding video frame and thus, only two frames of video are selected: the first frame of video and the second frame of video. For the last frame of video, only the last frame and the second-to-last frame are available. In such cases, the displacement model may be generated using a portion of the frame to be modified in some embodiments.

In one embodiment, the first frame in a video is modified based on features located in scan lines between the middle scan line and the last scan line in the first frame and features located in scan lines between the middle scan line and the last scan line in the second frame. In this embodiment, a displacement model for a first frame of a video is generated for the entire first frame, however displacement for the half of the frame between the first scan line and the middle scan line is set to indicate no displacement, while displacements for scan lines between the middle scan line and the last scan line in the second frame are based on displacements calculated based on the identified features. Similarly, the last frame of video is modified according to displacements identified in scan lines between the first scan line and the middle scan line, while displacements are set to indicate no movement for pixels located in the scan lines between the middle scan line and the last scan line in the frame. Thus, in this embodiment only portions of the first and last frames of video are modified. However, in some embodiments, a displacement model for the entire first frame may be generated based on common features between the first and second frames located at any place within the first and second frames, while a displacement model for the entire last frame may be generated based on common features between the second-to-last and last frames located at any place within the second-to-last and last frames of video.

After determining displacements for the identified features, the displacements are adjusted based on time delay factors for each scan line. As discussed above, scan lines between the middle scan line and either of the edges will have linearly-spaced delays. The time delay factor for each identified feature is then multiplied against the calculated spatial offset for the feature to generate a set of modified spatial offsets. To this set of modified spatial offsets, a set of zero offsets are added to virtual (or hypothetical) features located at each edge of the middle scan line and the mid-point of the middle scan line.

After generating this set of spatial offsets for the identified features and for the hypothetical features along the middle scan line, the artifact repair application generates a displacement model for the frame, $F_2$. In this embodiment, the artifact repair application generates a displacement model for each pixel in the frame using a thin plate spline algorithm. In other embodiments, other suitable interpolation algorithms may be used. For example, in one embodiment, a convolution of displacements with a Gaussian filter may be used. After generating the displacement model, the method 600 proceeds to block 608.

In block 608, the artifact repair application builds a mesh warp from the displacement model and 'pins' the edges of the mesh that would otherwise land inside the output frame such that the edges of the mesh are defined has having no distortion. The mesh warp may be generated from a suitable algorithm. For example, in one embodiment, generating the mesh warp includes attenuating distances of each of the plurality of features based on the respective feature's distance from the centerline.

Figure 2A:
FIGS. 2A-B shows a warped video frame and a black and white representation of the warped video frame according to one embodiment.
Figure 2B:
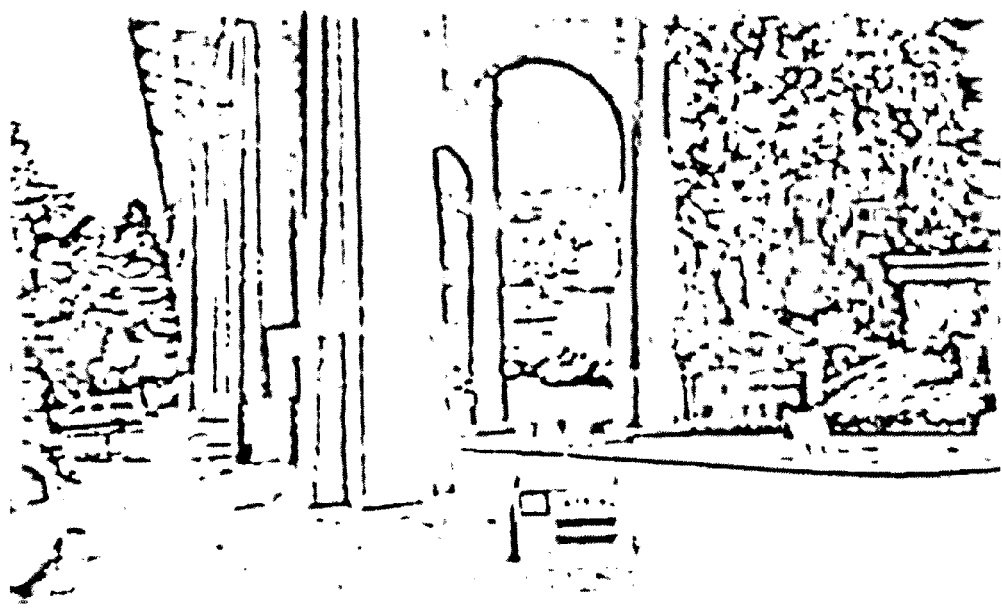

In block 610, the video frame, $F_2$, is warped using the pinned mesh warp to generate a warped frame. For example, in this embodiment, the original middle frame, shown in FIG. 1B with corresponding black and white representation in FIG. 1E, is warped to obtain the warped frame shown in FIG. 2A and the corresponding black and white representation in FIG. 2B. As can be seen in FIGS. 2A-B, the support pillars, for example, now appear to be de-skewed, i.e. approximately vertical. Other objects in the frame similarly appear de-skewed as well.

After the warped frame is generated, the artifact repair application may terminate, or it may return to block 602 and process another set of video frames. For example, to remove distortion from an entire video file, the artifact repair application may iterate through each frame of the video and perform the method 600 shown in FIG. 6. As discussed previously, however, the first frame and last frame of the video, only two frames may be used. In such a scenario, the embodiment shown in FIG. 6 may be configured to operate on only two consecutive frames. For example, for the first frame of the video, no preceding frame is available, only a subsequent frame. Thus, features moving in the top half of the first frame may not be analyzed. Similarly, for the last frame of the video, no subsequent frame is available. Thus, the features in the bottom half of the last frame may not be analyzed.

General

While the methods and systems herein are described in terms of software executing on various machines, the methods and systems may also be implemented as specifically-configured hardware, such a field-programmable gate array (FPGA) specifically to execute the various methods. For example, referring again to FIGS. 4 and 5, embodiments can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to "one embodiment" or "an embodiment" means that a particular feature, structure, operation, or other characteristic described in connection with the embodiment may be included in at least one implementation of the disclosure. The disclosure is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other That which is claimed is:

1. A computer-implemented method comprising
  receiving, by one or more processors, two frames ($F_0$, $F_2$) of a video;
  identifying, by one or more of the processors, a first plurality of features in frame $F_0$ and a second plurality of features in frame $F_2$;
  determining, by one or more of the processors, movements of corresponding features in the first and second pluralities of features;
  generating, by one or more of the processors, a mesh based on the first and second pluralities of features and the movements; and
  generating, by one or more of the processors, a warped frame ($F_0'$) of video based on the mesh.

2. The computer-implemented method of claim 1, further comprising pinning, by one or more of the processors, edges and a centerline of the mesh.

3. The computer-implemented method of claim 1, wherein each of frames $F_0$ and $F_2$ comprises a plurality of scan lines, and further comprising selecting, by one or more of the processors, a scan line of frame $F_0$ to be a centerline of the mesh.

4. The computer-implemented method of claim 3, wherein generating the mesh further comprises attenuating distances of each of the plurality of features based on the respective feature's distance from the centerline.

5. The computer-implemented method of claim 3, wherein the centerline comprises a scan line of frame $F_0$ that is equidistant between a first scan line and a last scan line of frame $F_0$.

6. The computer-implemented method of claim 1, further comprising:
  receiving, by one or more of the processors, a third frame ($F_1$) of the video;
  identifying, by one or more of the processors, a third plurality of features in frame $F_1$; and
  wherein determining the movements comprises determining movements of corresponding features in the first, second, and third pluralities of features, and generating the mesh is further based on the third plurality of features.

7. The computer-implemented method of claim 6, wherein frames $F_0$, $F_1$, and $F_2$ are consecutive frames of video, and frame $F_1$ is positioned between frames $F_0$ and $F_2$.

8. The computer-implemented method of claim 1, wherein frames $F_0$ and $F_2$ are consecutive frames of video.

9. The computer-implemented method of claim 1, wherein generating the mesh comprises thin plate spline interpolation.

10. A computer-readable medium comprising program code for causing a processor to execute a method, the program code comprising:
  program code for receiving two frames ($F_0$, $F_2$) of a video;
  program code for identifying a first plurality of features in frame $F_0$ and a second plurality of features in frame $F_2$;
  program code for determining movements of corresponding features in the first and second pluralities of features;
  program code for generating a mesh based on the first and second pluralities of features and the movements; and
  program code for generating a warped frame ($F_0'$) based on the mesh.

11. The computer-readable medium of claim 10, further comprising program code for pinning edges and a centerline of the mesh.

12. The computer-readable medium of claim 10, wherein each of frames $F_0$ and $F_2$ comprises a plurality of scan lines, and further comprising selecting a scan line of frame $F_1$ to be a centerline of the mesh.

13. The computer-readable medium of claim 12, wherein generating the mesh further comprises attenuating distances of each of the plurality of features based on the respective feature's distance from the centerline.

14. The computer-readable medium of claim 12, wherein the centerline comprises a scan line of frame $F_0$ that is equidistant between a first scan line and a last scan line of frame $F_1$.

15. The computer-readable medium of claim 10, further comprising:
  program code for receiving a third frame ($F_1$) of the video;
  program code for identifying a third plurality of features in frame $F_1$; and
  wherein the program code for determining the movements comprises program code for determining movements of corresponding features in the first, second, and third pluralities of features, and generating the mesh is further based on the third plurality of features.

16. The computer-readable medium of claim 15, wherein frames $F_0$, $F_1$, and $F_2$ are consecutive frames of video, and frame $F_1$ is positioned between frames $F_0$ and $F_2$.

17. The computer-readable medium of claim 10, wherein frames $F_0$ and $F_2$ are consecutive frames of video.

18. The computer-readable medium of claim 10, wherein the program code for generating the mesh comprises program code for thin plate spline interpolation.

19. A system comprising:
  a computer-readable medium; and
  a processor in communication with the computer-readable medium, the processor configured to:
    receive two frames ($F_0$, $F_2$) of a video;
    identify a first plurality of features in frame $F_0$ and a second plurality of features in frame $F_2$;
    determine movements of corresponding features in the first and second pluralities of features;
    generate a mesh based on the first and second pluralities of features and the movements; and
    generate a warped frame ($F_0'$) based on the mesh.

20. The system of claim 19, wherein the processor is further configured to pin edges and a centerline of the mesh.

21. The system of claim 19, wherein the processor is in communication with a remote computer over a network, and wherein the processor is further configured to receive frames $F_0$ and $F_2$ from the remote computer.

22. The system of claim 21, wherein the processor is further configured to transmit warped frame $F_0'$ to the remote computer.

23. The system of claim 19, wherein the processor is further configured to:
  receive a third frame ($F_1$) of the video;
  identify a third plurality of features in frame $F_1$; and
  wherein the processor is configured to determine the movements of corresponding features in the first, second, and third pluralities of features, and wherein the processor is further configured to generate the mesh based on the third plurality of features.

* * * * *